United States Patent [19]
Foster

[11] Patent Number: 6,000,530
[45] Date of Patent: Dec. 14, 1999

[54] DRIVE BEAM CONNECTOR AND CONNECTION METHOD

[76] Inventor: Raymond Keith Foster, P.O. Box 1, Madras, Oreg. 97741

[21] Appl. No.: 09/293,924

[22] Filed: Apr. 16, 1999

[51] Int. Cl.[6] .................................................... B65G 25/04
[52] U.S. Cl. ..................................... 198/750.6; 198/750.2
[58] Field of Search ............................. 198/750.1, 750.2, 198/750.5, 750.6

[56] References Cited

U.S. PATENT DOCUMENTS

| | | | |
|---|---|---|---|
| 5,165,524 | 11/1992 | Foster | 198/750 |
| 5,263,573 | 11/1993 | Hallstrom, Jr. | 198/750.6 |
| 5,402,878 | 4/1995 | Lutz | 198/750.6 |
| 5,544,739 | 8/1996 | Christiaens et al. | 198/750.6 |

*Primary Examiner*—James R. Bidwell
*Attorney, Agent, or Firm*—Joan H. Pauley

[57] ABSTRACT

A conveyor includes floor slats 36 connected to transverse drive beams 20 by connectors 22. Each connector 22 comprises a base 24 secured to the corresponding drive beam 20 and a nut element 30. Laterally elongated openings in the base allow the base and nut element to move laterally in relation to one another during attachment of the floor slat 36 to the drive beam 20. The base and nut element may have a laterally extending tongue and groove interface 42. Each slat has longitudinally spaced preformed openings at least one of which is positioned over each drive beam to allow the slat to be connected to any one of the drive beams.

29 Claims, 9 Drawing Sheets

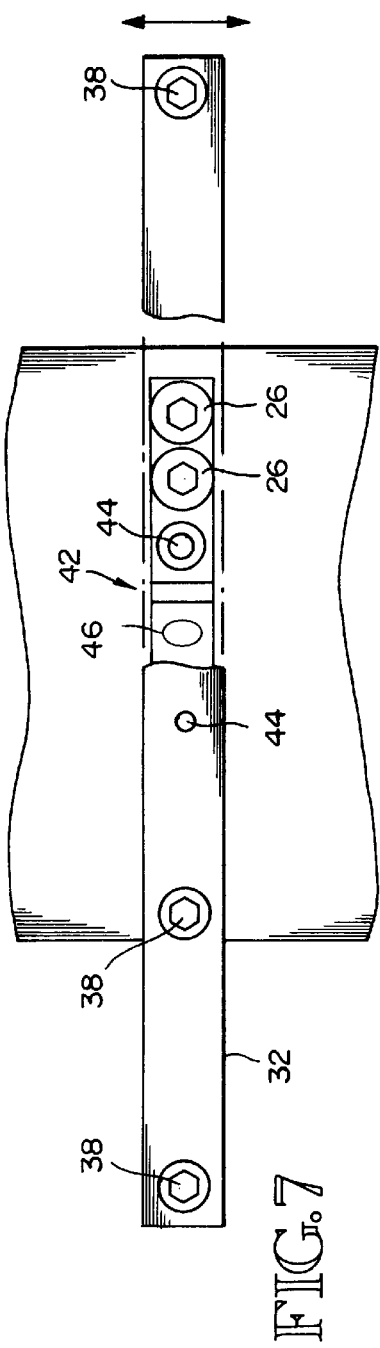
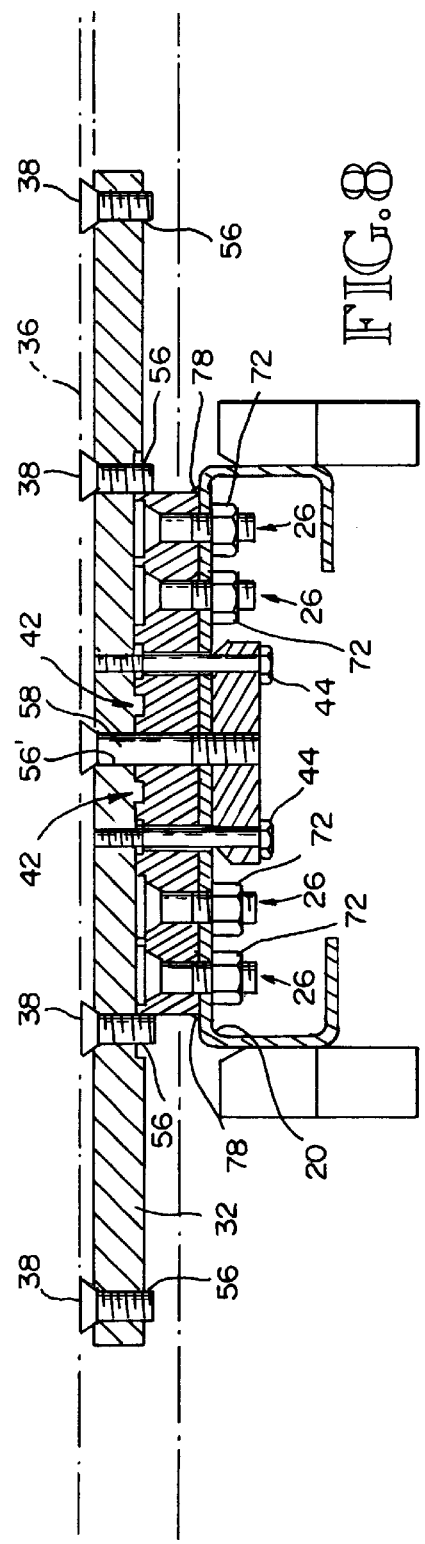

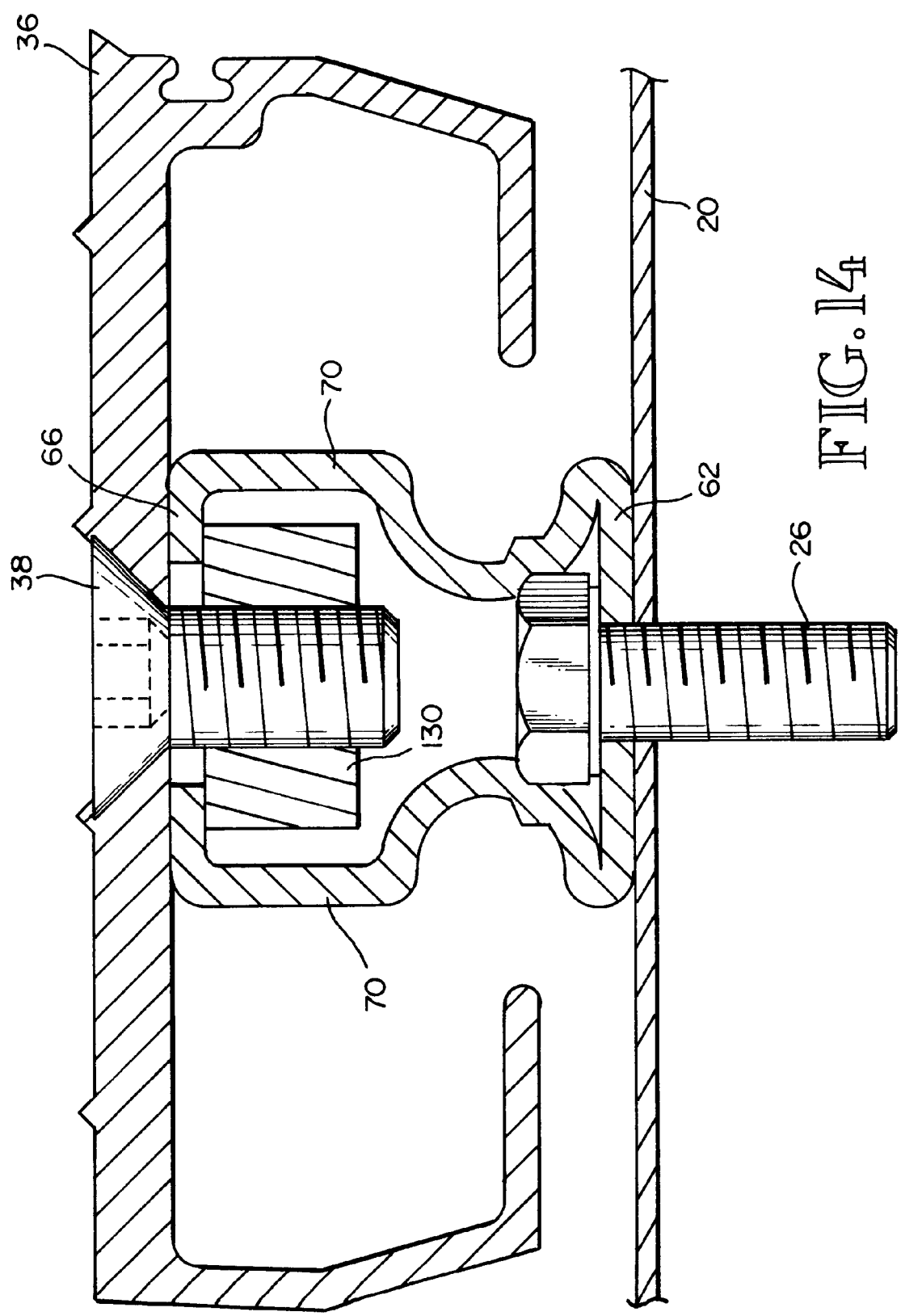

DRIVE BEAM CONNECTOR AND CONNECTION METHOD

TECHNICAL FIELD

This invention relates to reciprocating slat conveyors. More particularly, it relates to a method and apparatus for connecting floor slats to transverse drive beams without requiring access to the area below the drive beams.

BACKGROUND OF THE INVENTION

A substantially complete reciprocating slat conveyor system is disclosed by my U.S. Pat. No. 5,165,524, granted Nov. 24, 1992 and entitled Reciprocating Floor Conveyor. A reciprocating slat conveyor comprises a plurality of floor slats mounted adjacent each other for longitudinal reciprocation. The typical operation of a reciprocating slat conveyor is illustrated in my aforementioned U.S. Pat. No. 5,165,524, FIGS. 2–6. The floor slats are divided into three sets, identified by the numerals "1", "2", and "3", respectively. The slats are arranged in a plurality of groups, with each group including adjacent slats, one from each set. Translation of a load "L" is accomplished by the simultaneous movement of all three sets of slats. The slats are then retracted, one set at a time. The conveyor includes three transverse drive beams, one for each set of slats. The slats of each set are connected to the corresponding drive beam by a plurality of connectors attached to the drive beam. Each drive beam is connected to a drive motor for selectively reciprocating the slats. The slats are also supported by bearings positioned over longitudinal guide beams.

FIG. 1 shows a prior art conveyor having a drive assembly including a frame 2, three drive units 4, three transverse drive beams 6, and connectors 8. Referring to FIG. 1, in the conventional procedure for installing a reciprocating slat conveyor, the drive assembly is first installed. Then, the conveyor slats are positioned above the drive assembly. A worker gets below the drive assembly and drills upwardly through holes in the connectors 8 to form corresponding holes in each slat. Then, a nut is held in place below the connector 8 while a bolt is inserted through the drilled slat hole from above the slat and is threaded into the nut. This conventional procedure is cumbersome due to the need to drill metal parts at a location removed from the fabrication facility, and the necessity for a worker to access the area below the drive assembly.

BRIEF SUMMARY OF THE INVENTION

The present invention provides a connector for securing the floor slats to the transverse drive beams in a reciprocating slat conveyor. The connector comprises a base secured to one of the drive beams. The base has an opening that is enlarged in the lateral direction. A bolt extends through a hole in the floor slat, through the enlarged opening, and threadedly engages a nut element with internal threads. The opening in the base allows lateral movement of the bolt relative to the base while the drive beam and floor slat are being connected to each other.

A laterally extending tongue and groove interface may be placed between the base and the nut element. The tongue and groove interface permits lateral movement of the nut element relative to the base while the drive beam and floor slat are being connected to each other. A bearing may be positioned between the base and nut element, facilitating the relative motion of the nut element and base during connection. The bearing may be compressed upon tightening of the bolt.

In a first embodiment, the nut element comprises two members, the first member including the threads and the second member being above the first member. The base is positioned between the two members comprising the nut element. A fastener may slidably extend through the first member and threadedly engage the second member. In such case, the bearing is preferably an O-ring surrounding the fastener at an interface between the base and the nut element.

In a second embodiment, the base comprises an elongated tubular member with an upper wall, a lower wall, and sidewalls connecting the upper wall to the lower wall. The nut element is positioned within the tubular base. A positioning element is used to restrict vertical and longitudinal movement of the nut element relative to the base while the drive beam and floor slat are being connected to each other. The positioning element is preferably a pair of brackets positioned adjacent to longitudinally opposite ends of the base. Each bracket has an upper leg secured to the base, a lower leg to support the nut element, and a intermediate. leg connecting the upper and lower legs. The base may be secured to the drive beam with bolts extending through the lower wall of the base, with the heads of the bolts between the upper and lower walls. The sidewalls of the base are deformed to contact and engage the heads to prevent rotation of the bolts.

The invention also provides a conveyor comprising a plurality of linear hydraulic motors, each connected to a transverse drive beam, in combination with slats with preformed longitudinally spaced openings, and longitudinally elongated connecting members, each having a plurality of longitudinally spaced openings extending therethrough. Each connecting member is of sufficient length to be positionable to extend across the drive beams with at least one of the openings in the connecting member positioned above each drive beam. Each slat may be connected to any one of the drive beams by inserting a fastener into the aligned openings in the slat and connecting member.

The method of the invention is a method of attaching floor slats to a drive assembly of a reciprocating slat conveyor. The drive assembly includes a plurality of transverse drive beams. According to an aspect of the invention, the method comprises providing a connector for each slat. The connector has a base secured to one of the drive beams, and a nut element. The base includes a plurality of laterally elongated, longitudinally spaced openings extending therethrough. A plurality of longitudinally spaced openings are preformed in each slat. The slat is positioned above the drive beams, with the openings in the slat being aligned with the openings in the base. A connection between the slat and a selected drive beam is created by use of a bolt. The bolt is extended down through one of the openings in the slat, one of the openings in the base, and a threaded hole in the nut element. This procedure includes allowing the slat to move laterally relative to the base to align the slat laterally with the drive beam. It also includes turning the bolt to threadedly engage the nut element and tighten the connection between the slat and the drive beam.

The invention eliminates the need for drilling of the slats during installation of the conveyor. The slats used in conjunction with the invention are preformed with openings to receive the bolts for attachment to the drive beams. The invention also eliminates the need for access below the drive beams to attach the slats, allowing installation by one worker without assistance of another.

BRIEF DESCRIPTION OF THE DRAWINGS

In the drawings, like element designations refer to like parts throughout, and:

FIG. 7 is like FIG. 5 except that it shows the connector attached to the middle drive beam.

FIG. 8. is like FIG. 6 except that it shows the connector for the middle drive beam.

FIG. 14 is a cross-sectional view of the second embodiment of the connector with all components positioned after final assembly, with parts shown in elevation.

DETAILED DESCRIPTION OF THE INVENTION

Figure 11:
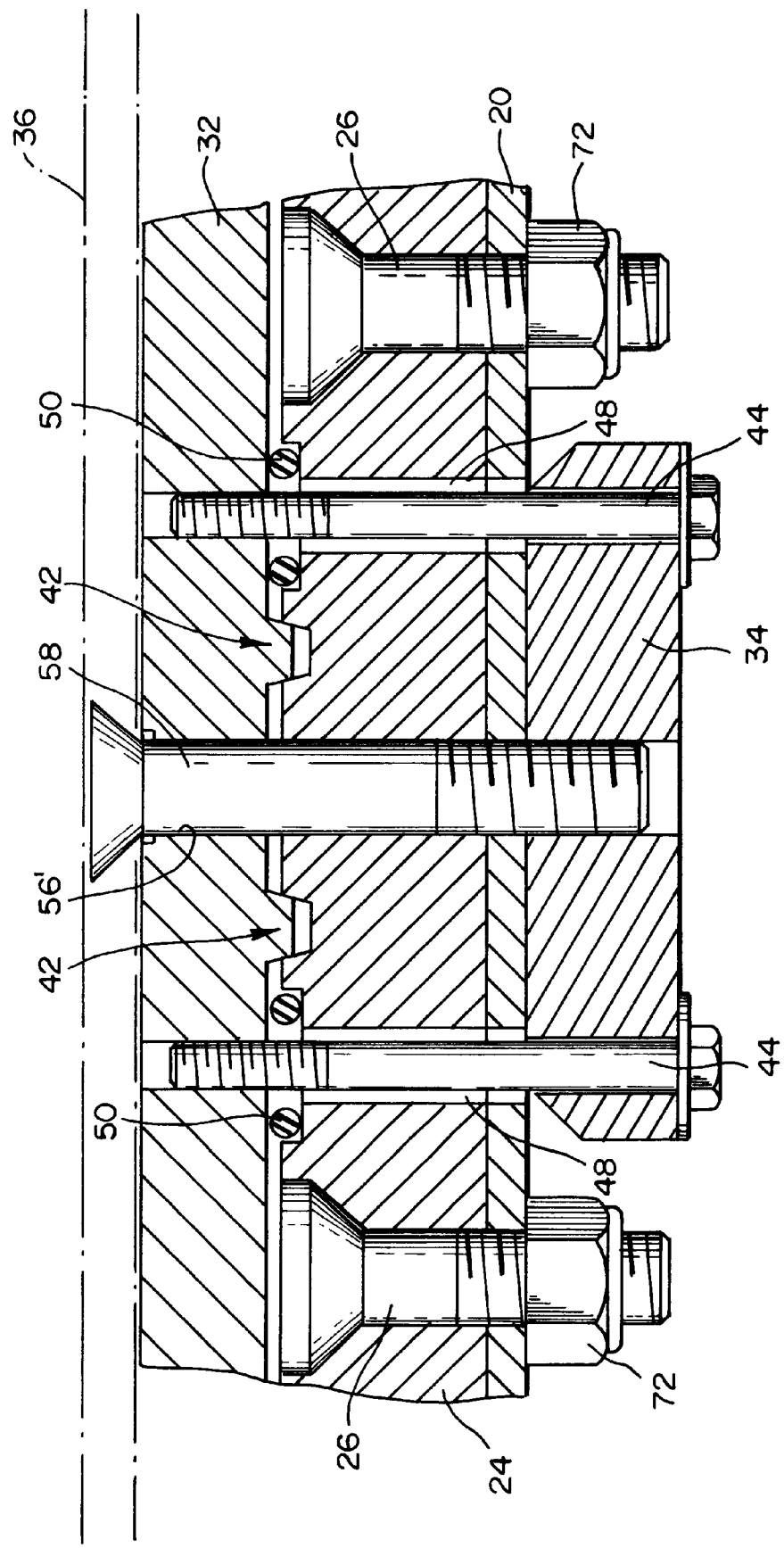
FIG. 11 is a fragmentary longitudinal sectional view showing detail of the components of the first embodiment of the connector as they are positioned before the central fastener is tightened, with parts shown in elevation.
Figure 12:
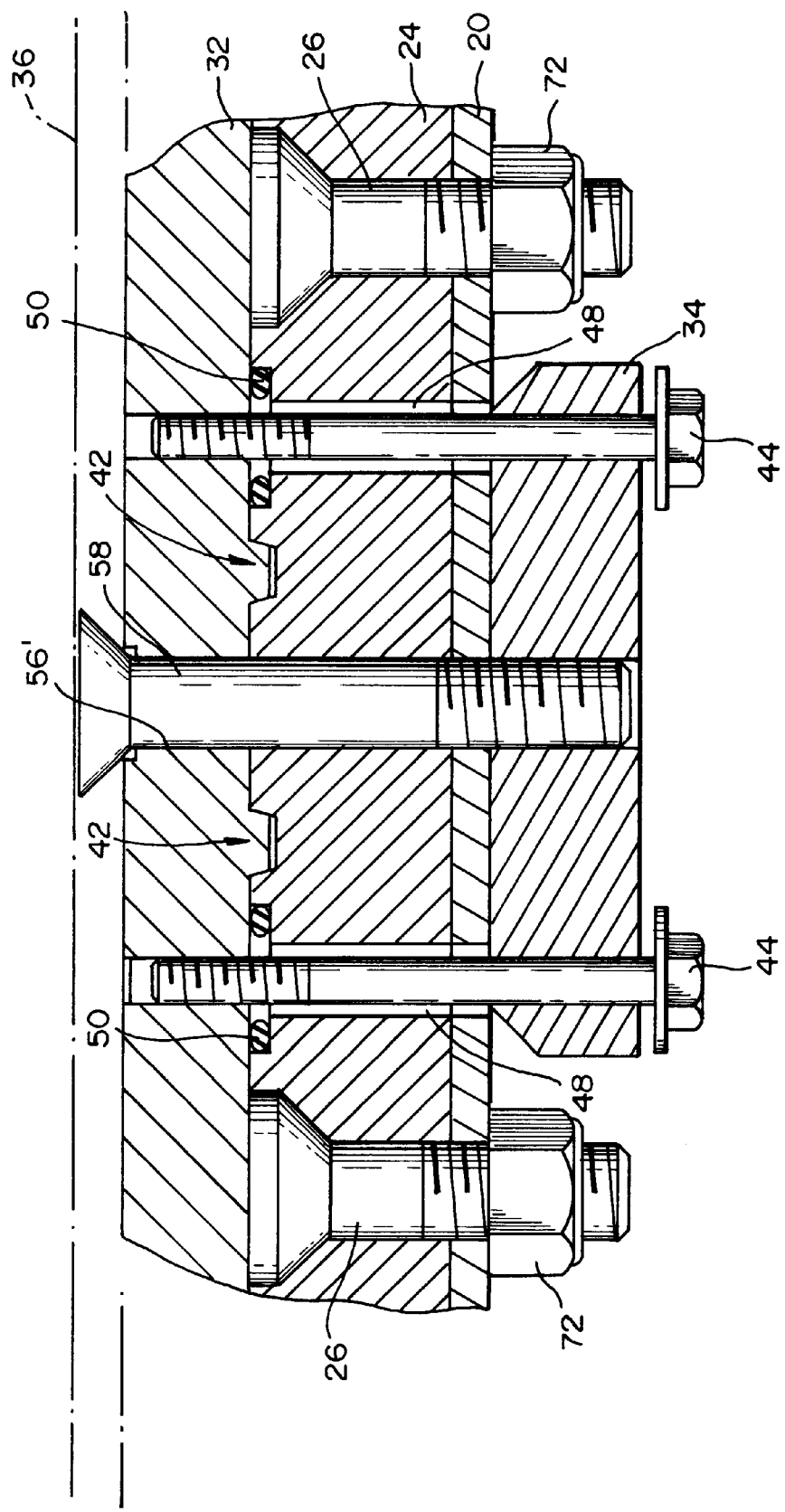
FIG. 12 is like FIG. 11 showing the components after the central fastener is tightened.
Figure 13:
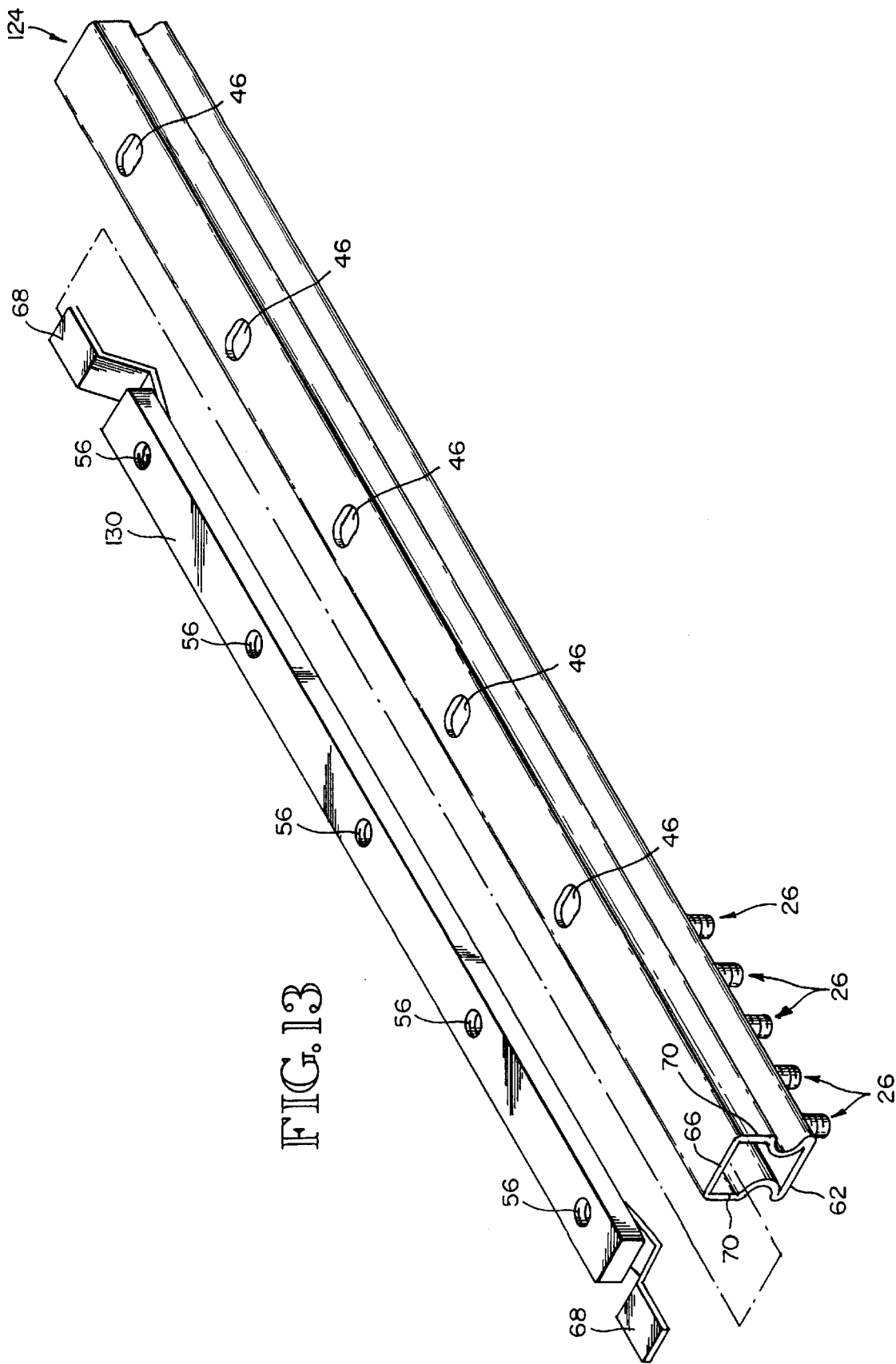
FIG. 13 is an exploded pictorial view of the second embodiment of the connector.

The drawings illustrate two embodiments of the connector as well as a method for connecting the floor slats to the drive beams. The first embodiment of the connector is shown in FIGS. 2–12, and the second embodiment is shown in FIGS. 13 and 14. Both embodiments of the connector are characterized by a base secured to the drive beam and a nut element that is secured to the floor slat during installation of the conveyor. The base may be formed separately from the drive beam and then secured thereto. Alternatively, it may be integrally formed with the drive beam. The connector is intended to be used with floor slats having preformed openings therethrough. During connection of the floor slats to the drive beams, the connector allows lateral "float" between the base and nut element and makes it possible to connect the slats to the drive beams from above, with no drilling at the installation location and no need to access the area below the drive beams.

Figure 1:
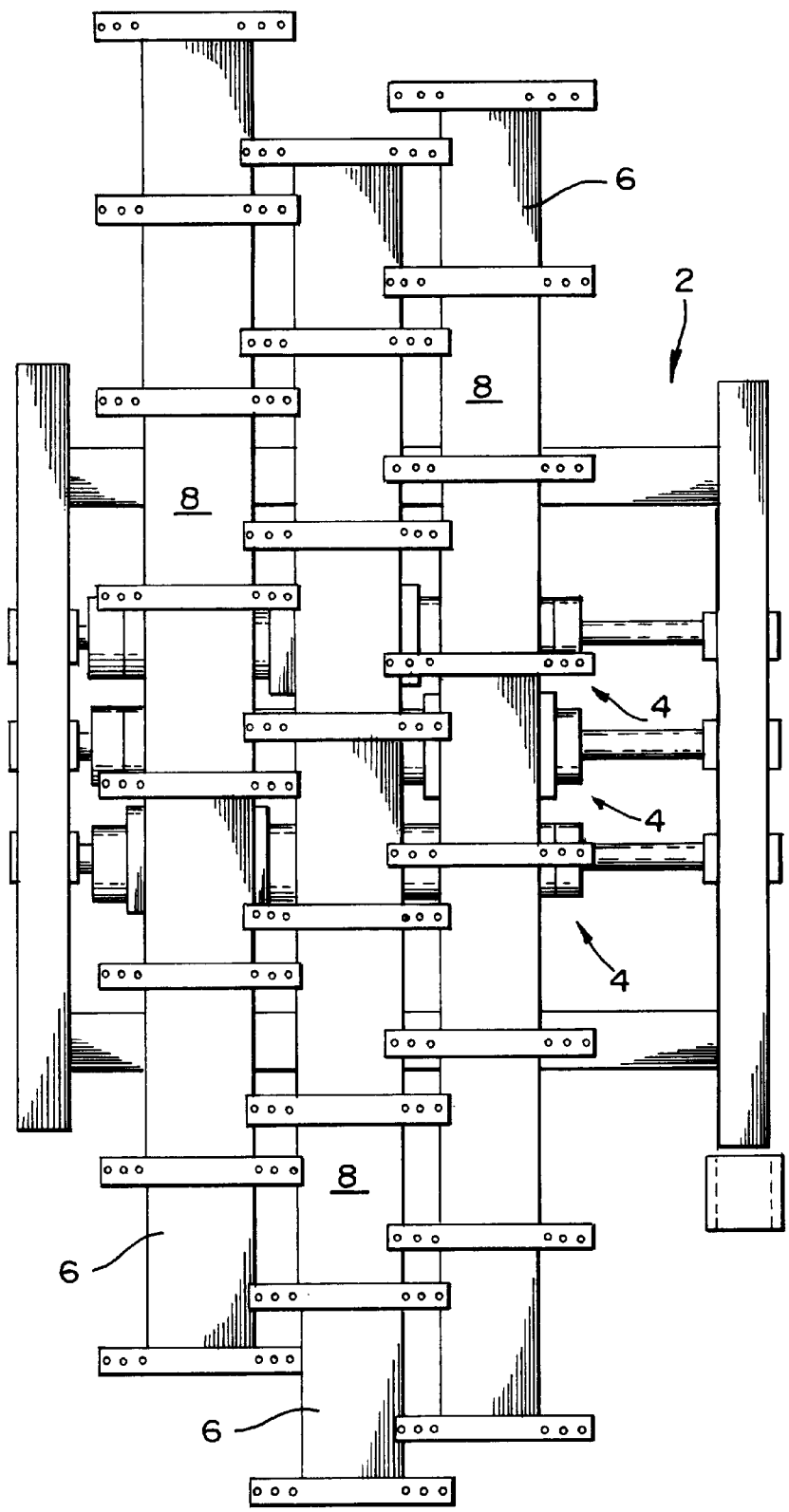
FIG. 1 is a top plan view of a conveyor, with the floor slats omitted, showing prior art slat to drive beam connectors.
Figure 3:
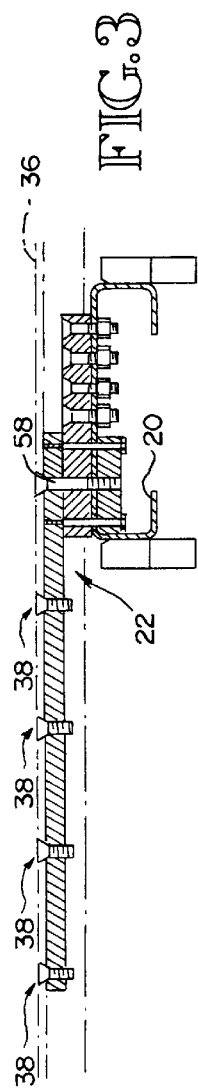
FIGS. 2–4 are longitudinal sectional views of a conveyor having three transverse drive beams, showing a first embodiment of the connector of the invention attached to each of the drive beams, respectively, with the corresponding floor slats shown in broken lines and with portions of the conveyor omitted in FIGS. 3 and 4.
Figure 4:
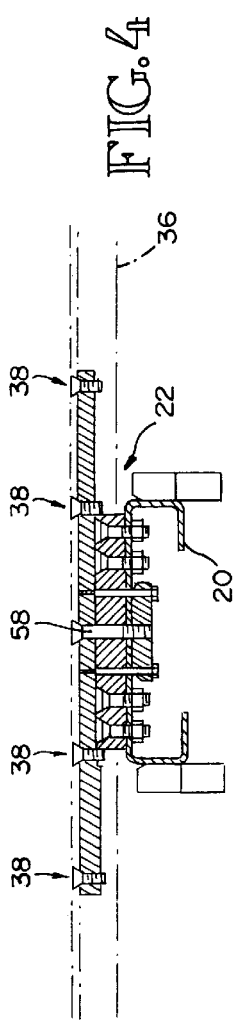
Figure 2:
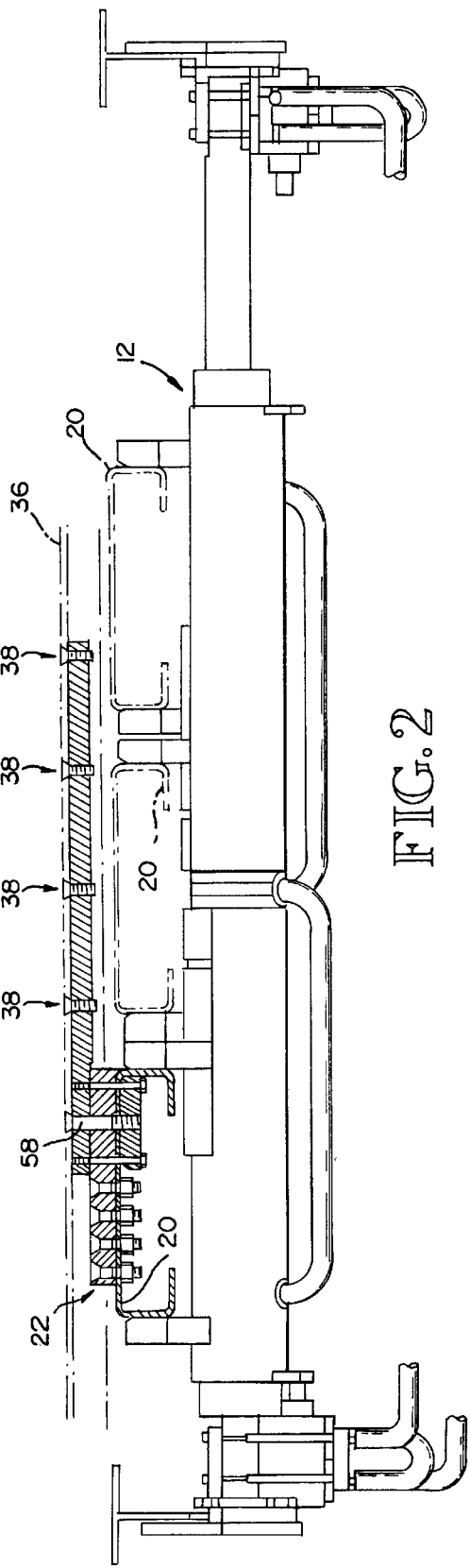
Figure 5:
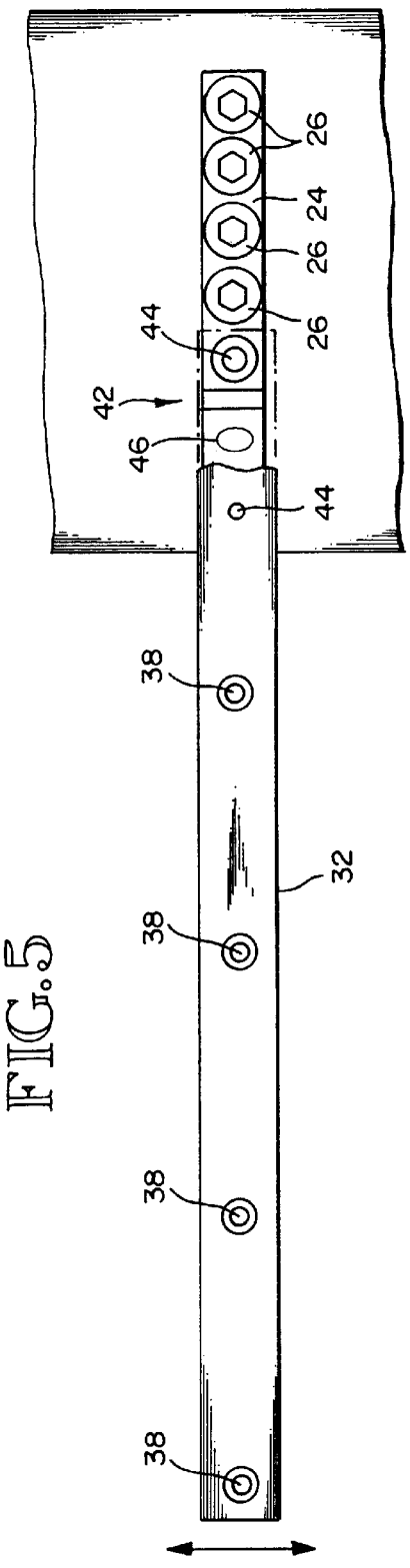
FIG. 5 is a top plan view of the first embodiment of the connector attached to a longitudinally outer drive beam, with top portions cut away in the area of the connection between the base and nut element.
Figure 6:
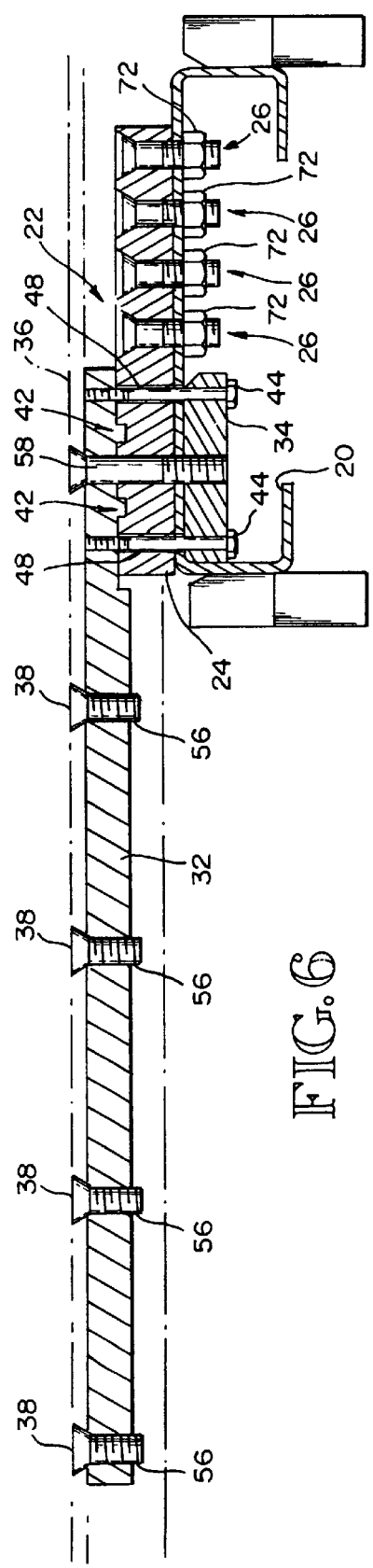
FIG. 6. is an enlargement of FIG. 3.

The conveyor shown in FIGS. 2–12 includes three linear hydraulic drive motors 12 and three corresponding longitudinally adjacent drive beams 20 to which the slats 36 are connected by the first embodiment of the connector 22. Each connector 22 has a base 24 secured to the corresponding drive beam 20. The base 24 has slight differences depending on whether the particular connector 22 is attached to a longitudinal end drive beam 20, as shown in FIGS. 2 and 3, or the middle drive beam 20, as shown in FIG. 4. The connectors 22 on the end drive beams 20 are identical, but are installed in opposite longitudinal orientations. The base 24 is preferably a solid member made of a strong material, such as steel, and extends across the top of the drive beam 20 along most of the width of the drive beam 20. The base 24 is secured to the top of the drive beam 20 by a plurality of fasteners 26. Preferably, the fasteners 26 are bolts with securing nuts 72. The base 24 is further secured to the drive beam 20 by a plurality of fillet welds 78 (FIG. 8).

The nut element 32, 34 comprises a first member 34 and a second member 32. The second member 32 is positioned above the base 24, and the first member 34 is positioned below the base 24 and the drive beam 20. The second member 32 is secured to the floor slat 36 as described below. As in the case of the base 24, the second member 32 varies slightly in configuration depending on which drive beam 20 it is connected to. The second member 32 is a solid bar and is also referred to herein as a "connecting member". The first member 34 is an enlarged nut with an internally threaded opening. Both are preferably made of a strong material, such as steel. The second member 32 and first member 34 are loosely joined together by a plurality of fasteners 44 that extend through oversize holes 48 in the base 24 and drive beam 20, with the drive beam 20 positioned between the base 24 and the first member 34. Each fastener 44 extends slidably through the first member 34 and threadedly engages the second member 32.

The second member 32 of the nut element 32, 34 is longitudinally elongated and has a plurality of longitudinally spaced openings 56, 56' extending therethrough. The member 32 has sufficient length to be positionable to extend across all three drive beams 20 with at least one opening 56, 56' positioned above each drive beam 20. As used in this context, the term "across" does not require that the member 32 extend all the way across the width of each drive beam 20. All that is required is that it extend over at least a portion of the width of the drive beam 20. The second member 32 of each nut element 32, 34 is substantially identical to the second member 32 of each other nut element 32, 34. except for the location of the threaded holes for the fasteners 44 and the unthreaded opening 56'. The second member 32 is secured to the corresponding slat 36 by a plurality of fasteners 38. As illustrated, each fastener 38 is a flat head screw that is countersunk into the floor slat 36 and threadedly engages one of the openings 56 in the second member 32.

The base 24 and nut element 32, 34 are connected together to connect the floor slat 36 to the drive beam 20. In the first embodiment, the connection is accomplished by a bolt 58. The bolt 58 extends through the opening 56' in the second member 32 and corresponding openings in the base 24 and the first member 34. The choice of the location of the opening 56' is determined by which drive beam 20 the slat 36 is being connected to.

The connection between the base 24 and nut element 32, 34 allows the base 24 and nut element 32, 34 to move laterally relative to each other while the slat 36 is being connected to the drive beam 20. In the first embodiment, the relative lateral movement is achieved by the lateral oversizing of the openings 46, 56' in the base 24, drive beam 20 and first member 32 through which the bolt 58 extends. The lateral oversizing of the openings 46, 56' can be seen in FIG. 9. A laterally extending tongue and groove interface 42 between the first member 32 and the base 24 preserves the relative lateral movability while also providing additional abutting surfaces to carry the applied longitudinal forces during operation of the conveyor. These additional load-transmitting surfaces relieve shear forces on the bolt 58.

An additional preferred feature of the first embodiment is the positioning of low friction bearings 50 between the base 24 and the second member 32 of the nut element 32, 34 at the interface adjacent to the tongue and groove connection 42. As shown, each bearing comprises an O-ring surrounding one of the fasteners 44. The O-rings 50 may be made from a synthetic material. An example of a suitable O-ring is a 206 O-ring comprising nitrile. The bearing 50 provides lubrication to facilitate movement of the nut element 32, 34 relative to the base 24 while the drive beam 20 and floor slat 36 are being connected to each other.

As noted above, the connector 22 is intended to be used for connecting to the transverse drive beam 20 a floor slat having a plurality of preformed longitudinally spaced openings in a top portion thereof. FIG. 2 shows a portion of a reciprocating floor conveyor of a known type. The conveyor has a plurality of elongated floor slats 36, one of which is shown in broken lines in FIG. 2. The slats 36 are mounted laterally adjacent to each other for longitudinal reciprocation. As in the prior art conveyor described above, the slats 36 are divided into sets and groups, with each group including at least two adjacent slats, one slat from each set. A plurality of linear hydraulic drive motors 12, one for each set of slats 36, are provided for selectively reciprocating the slats 36. Each motor 12 is connected to a corresponding transverse drive beam 20. The motor 12 is operated to selectively move the slats 36 in the set corresponding to the motor 12 and the drive beam 20 to which the motor 12 is connected.

Each slat 36 has a number of longitudinally spaced openings corresponding to the number of longitudinally spaced openings 56, 56' in each of the second members 32 of the nut elements 32, 34. The slat openings are preformed in a top portion of the slat 36. As described above, each second member 32 has sufficient length to be positionable to extend across the drive beams 20 with at least one of the openings 56, 56' in the second member 32 positioned above each drive beam 20. The openings in the slat 36 are longitudinally alignable with the openings in the second member 32. This permits each slat 36 to be connected to any one of the drive beams 20 by extending a fastener through the opening 56, 56' in the corresponding second member 32 positioned above the drive beam 20, and through the aligned opening in the slat 36. In the illustrated first preferred embodiment, the fastener is the bolt 58, and the bolt 58 is extended through the laterally enlarged opening 56'.

The invention encompasses a connector for connecting floor slats to transverse drive beams, a conveyor, and a method of installing floor slats on the drive beams of a drive assembly. It is anticipated that the invention will be used in situations in which the drive assembly is first installed in a structure and then the floor slats are installed by connecting them to the drive beams. In order to accomplish the installation of a slat 36, the slat 36 with the openings preformed therein is positioned above the drive assembly. The openings in the slat 36 are aligned with the laterally elongated openings 46 in the base 24 of the corresponding connector 22. Depending on the details of the structure of the slat 36, the positioning may be accomplished by snapping the floor slat 36 down over the bearings and onto the second member 32 of the nut element 32, 34, or by sliding the slat 36 longitudinally along the conveyor to slide the second member 32 into position adjacent to the lower surface of the top wall of the slat 36 and between the downwardly depending sidewalls of the slat 36. Since each of the slats 36 and second nut element members 32 in the preferred embodiment have sufficient openings therethrough to have at least one opening above each drive beam 20, all of the slats 36 in the conveyor may be aligned in a longitudinal direction during the slat installation procedure.

Figure 9:
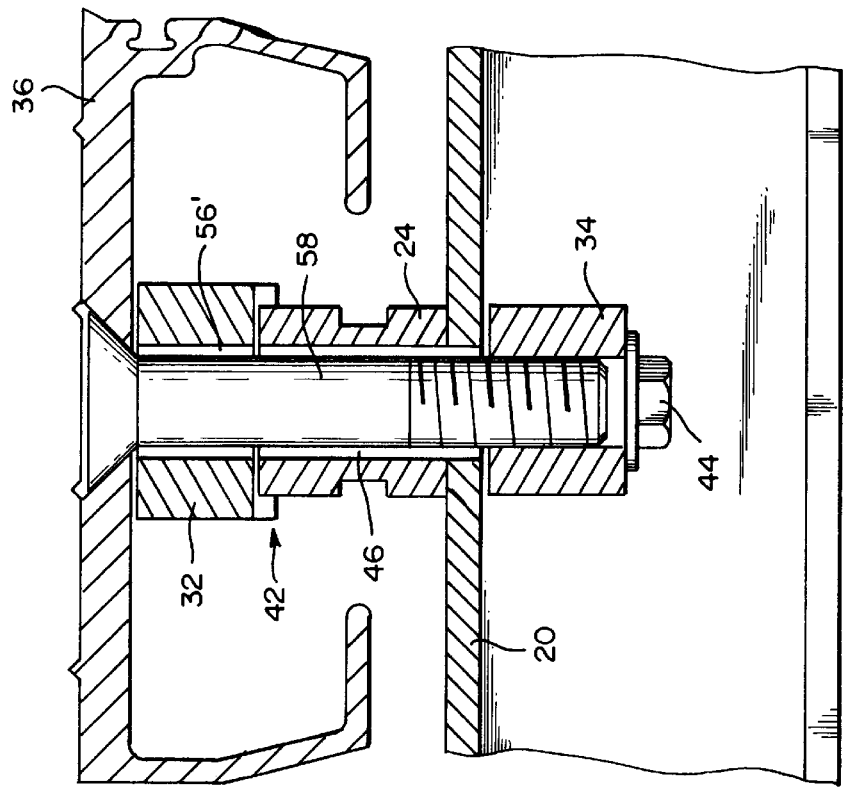
FIG. 9 is a cross-sectional view of the first embodiment of the connector showing the components in relation to a floor slat and drive beam as they are positioned before the central fastener is tightened, with the bolt shown in elevation.

Once the slat 36 has been moved into position above the drive beams 20, the bolt 58 is extended down through the aligned openings in the slat 36 and second member 32, the laterally elongated openings 46 through the base 24 and drive beam 20, and a threaded opening in the first member 34. In addition, shorter bolt fasteners 38 are extended through the threaded openings 56 in the second member 32 and the aligned openings in the slats 36. The positioning of the fasteners 38 may be done before the bolt 58 is inserted in order to facilitate the insertion of the bolt 58. Once all the bolts 38, 58 are in position as shown in FIG. 9, the short bolts 38 and connecting bolt 58 are tightened. The tightening of the bolts 38 secures the connection of the slat 36 to the second member 32. The tightening of the bolt 58 secures the connection to the drive beam 20.

Figure 10:
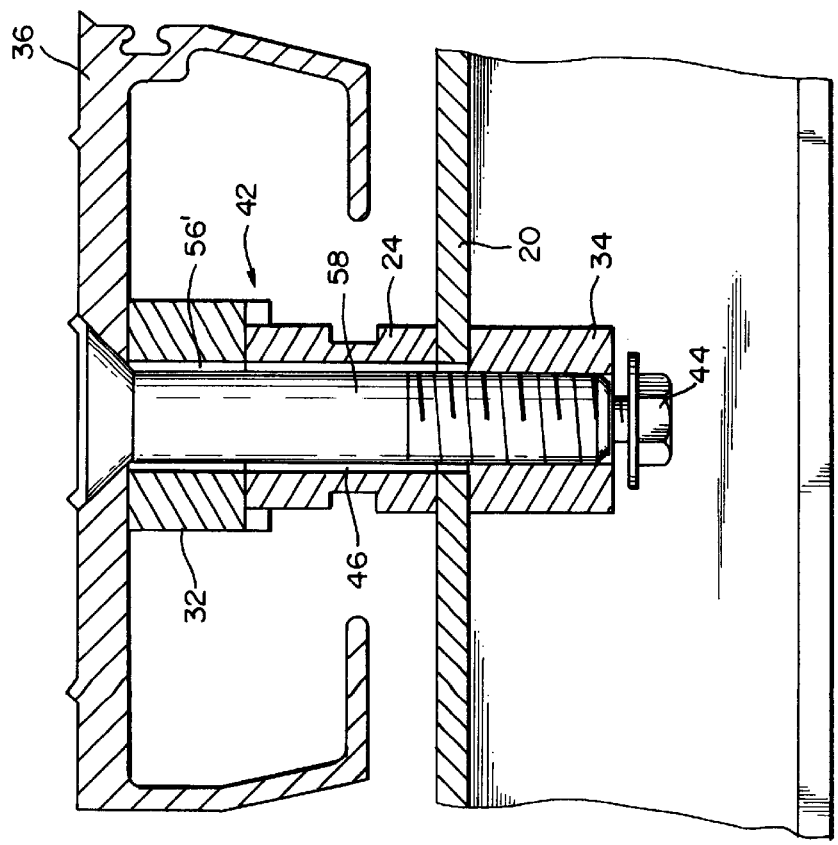
FIG. 10 is a cross-sectional view of the first embodiment of the connector showing the components in relation to a floor slat and drive beam as they are positioned after the central fastener is tightened, with the bolt shown in elevation.

While the bolt 58 is being inserted, the lateral elongation of the openings 56', 46 in the second member 32, base 24, and drive beam 20 allows lateral manipulation of the bolt 58 to enable correct insertion of the bolt 58 into the threaded opening in the first member 34. As shown in FIG. 11, the openings 48 in the base 24 and drive beam 20 through which the fasteners 44 extend are enlarged so that the fasteners 44 do not interfere with the insertion of the bolt 58. With the bolt 58 in position, the bolt 58 is turned to thread it into the lower first member 34 of the nut element 32, 34. As the bolt 58 is rotated, the threaded engagement with the first member 34 creates an upward pulling force on the first member 34. The upward force cannot move the first member 34 since it is positioned below the stationary drive beam 20. Therefore, the upward force results in downward movement of the slat 36 and the second member 32 to cinch the slat 36 and member 32 down into tight engagement with the base 24. As can be seen by a comparison of FIG. 9 with FIG. 10 and FIG. 11 with FIG. 12, the tightening of the bolt 58 results in the elimination of the small gap between the second member 32 and base 24. In addition, the tongue portions of the tongue and groove interface 42 are pulled further down into their corresponding grooves. The tightening also compresses the O-ring bearings 50. The final turns of the bolt 58 to bring its head into the countersink in the slat 36 create the final lateral alignment between the slat 36 and the drive beam 20.

Once the tightening has been completed, further relative lateral movement between the slat 36 and drive beam 20 is at least hindered and may be entirely prevented. In addition, the lower nut ends of the fasteners 44 no longer support the first member 34 since, as shown in FIGS. 10 and 12, the tightening of the connection creates a gap between the lower ends of the fasteners 44 and the first member 34. Preferably, the threaded engagement of the fasteners 44 with the second member 32 is treated with an adhesive, such as the adhesive marketed under the trademark LOCK-TITE. This prevents the fasteners 44 from moving out of position once the slats 36 have been installed and the conveyor is operated.

As stated above, the second embodiment of the connector 122 is shown in FIGS. 13 and 14. In this embodiment, the base 124 comprises an elongated tubular member having an upper wall 66 and a lower wall 62 interconnected by opposite sidewalls 70. The lower wall 62 is secured to the top of the drive beam 20 by a plurality of bolt fasteners 26. The base 124 has a length substantially the same as the length of the second member 32 in the first embodiment. The heads of the bolts 26 are positioned between the upper wall 66 and lower wall 62 of the tubular base 124 with the shaft of each fastener 26 extending downwardly through the lower wall 62 and the top of the drive beam 20. The sidewalls 70 are deformed to contact and engage the heads of the bolts 26 to prevent-rotational movement of the bolts 26 following the connection of the base 124 to the drive beam 20. The upper wall 66 has a plurality of longitudinally spaced, laterally elongated openings 46 extending therethrough.

The nut element 130 in the second embodiment comprises a longitudinally elongated solid bar having a plurality of longitudinally spaced threaded holes 56 extending therethrough. These holes are alignable with the openings 46 in the upper wall 66 of the base 124. The nut bar 130 is positioned inside the tubular base 124 between the upper wall 66 and the lower wall 62 and is preferably only loosely attached to the base 124. For this purpose, the second embodiment includes a positioning element connected to the base 124 between the upper wall 66 and lower wall 62. The positioning element supports the nut bar 130 and restricts longitudinal movement of the nut bar 130 relative to the base 124 while the drive beam 20 and floor slat 36 are being connected to each other. The preferred form of the positioning element is shown in FIG. 13. It comprises a pair of brackets 68 positioned adjacent to longitudinally opposite ends of the tubular member. Each bracket 68 is somewhat Z-shaped with an upper leg secured to the upper wall 66 of the tubular base 124, a lower leg that supports the nut bar 130, and an intermediate leg interconnecting the upper and lower legs.

In the use of the second embodiment of the connector 122, the base 124 is secured to the drive beam 20 by means of the fasteners 26, and the nut bar 130 is positioned inside the base 124. This is done as part of the manufacture of the drive assembly. At an installation location, the attachment of the floor slats 36 to the drive beams 20 begins, as in the case of the first embodiment, with the positioning of the slats 36 above the drive assembly. Each slat is positioned so that the base 124 of the corresponding connector 122 extends up into the floor slat, as shown in FIG. 14. When the slat 36 has been positioned, bolt fasteners 38 are inserted through aligned openings in the slat 36, upper wall 66 of the base 124, and nut element 130. The bolts 38 are tightened to secure the connection to the drive beam 20. The openings 46 in the base 124 are laterally elongated to allow lateral adjustment of the position of the slat 36 relative to the drive beam 20 during the connection of the slat 36 to the drive beam 20, in much the same manner as the laterally elongated openings in the first embodiment allow relative lateral movement.

The openings in the floor slats 36 and the bolt openings in the drive beam 20 are precision drilled during the manufacture of the elements 36, 20. The lateral float feature of the invention provided by the connector permits alignment of the slat openings and drive beam openings during connection of the slats to the drive beams 20. This results in proper alignment of the slats 36 with the drive beams 20 and proper spacing and dimensioning of the gaps between adjacent floor slats 36.

The illustrated embodiments are only examples of the present invention and, therefore, are non-limitive. It is to be understood than many changes in the particular structure, materials and features of the invention may be made without departing from the spirit and scope of the invention. Therefore, it is my intention that my patent rights not be limited by the particular embodiments illustrated and described herein, but rather be determined by the following claims, interpreted according to accepted doctrines of claim interpretation, including use of the doctrine of equivalents and reversal of parts.

What is claimed is:

1. For use in a reciprocating slat conveyor of a type comprising a plurality of floor slats mounted adjacent to each other for longitudinal reciprocation, and a plurality of transverse drive beams, a connector comprising:
   a base secured to one of said drive beams and having an opening extending therethrough, said opening being enlarged in a lateral direction;
   a nut element having internal threads; and
   a bolt extending through a hole in one of said floor slats and said opening and threadedly engaging said internal threads to connect said floor slat member to said drive beam, said bolt extending through said opening with clearance between said bolt and sidewall portions of said opening to allow lateral movement of said bolt relative to said basewhile the drive beam and floor slat are being connected to each other.

2. The connector according to claim, 1, wherein said connector comprises a laterally extending tongue and groove interface between said base and said nut element, said tongue and groove interface allowing lateral movement of said nut element relative to said base while the drive beam and floor slat are being connected to each other.

3. The connector according to claim 2, wherein said connector comprises at least one bearing positioned between said base and said nut element, said bearing facilitating movement of said nut element relative to said base while the drive beam and floor slat are being connected to each other.

4. The connector according to claim 1, wherein said connector comprises at least one bearing positioned between said base and said nut element, said bearing facilitating movement of said nut element relative to said base while the drive beam and floor slat are being connected to each other.

5. The connector according to claim 4, wherein tightening said bolt to connect the floor slat to the drive beam compresses said bearing.

6. The connector according to claim 1, wherein said nut element comprises a first member including said threads, and a separate second member positioned above said first member, said base being positioned between said first and second members.

7. The connector according to claim 6, wherein said second member is longitudinally elongated to extend over an adjacent drive beam.

8. The connector according to claim 5, wherein said nut element comprises a first member including said threads, and a separate second member positioned above said first member, said base being positioned between said first and second members.

9. The connector according to claim 8, wherein said connector comprises a fastener extending slidably through said first member and threadedly engaging said second member, and said bearing comprises an O-ring surrounding said fastener at an interface between said base and said nut element.

10. The connector according to claim 1, wherein said base comprises an elongated tubular member having an upper wall, a lower wall, and two sidewalls, said sidewalls connecting said upper wall to said lower wall; and said nut element is positioned between said upper wall and said lower wall.

11. The connector according to claim 10, wherein said connector comprises at least one positioning element connected to said base between said upper wall and said lower wall, said positioning element supporting said nut element and restricting longitudinal movement of said nut element relative to said base while the drive beam and floor slat are being connected to each other.

12. The connector according to claim 11, wherein said positioning element comprises a pair of brackets positioned adjacent to longitudinally opposite ends of said tubular member, each said bracket having an upper leg secured to said tubular member, a lower leg that supports said nut element, and an intermediate leg interconnecting said upper and lower legs.

13. The connector according to claim 10, wherein said base is secured to said drive beam by a plurality of bolts extending through said lower wall and having heads positioned between said upper wall and said lower wall.

14. The connector according to claim 13, wherein said sidewalls are deformed to contact and engage said heads to prevent rotational movement of said plurality of bolts.

15. A reciprocating slat conveyor having a plurality of elongated floor slats mounted adjacent each other for longitudinal reciprocation and divided into sets and groups, with each group including at least two adjacent slats, one slat from each set, a plurality of linear hydraulic drive motors, one for each set of slats, for selectively reciprocating the floor slats, and a plurality of transverse drive beams, one for each set, each said drive beam connected to one of said linear hydraulic drive motors and to each of said floor slats in the corresponding set, comprising:

each said slat having a plurality of preformed longitudinally spaced openings in a top portion thereof; and a plurality of longitudinally elongated connecting members, each said connecting member being connected to one of said drive beams and having a plurality of longitudinally spaced openings extending therethrough;

each said connecting member having sufficient length to be positionable to extend across said drive beams with at least one of said openings in said connecting member positioned above each said drive beam, and said openings in each said slat being longitudinally alignable with said openings in each said connecting member to permit each said slat to be connected to any one of said drive beams by extending a fastener through said at least one of said openings in said connecting member and an aligned opening in said slat.

16. A conveyor according to claim 15, comprising a plurality of connectors for connecting the slats to the drive beams, each said connector comprising:

a base secured to the drive beam to which said connecting member is connected, said base having a bolt opening extending therethrough, said bolt opening being enlarged in a lateral direction;

a nut element having internal threads and including said connecting member; and a bolt extending through one of said openings in the floor slat to be connected to said drive beam and said bolt opening and threadedly engaging said internal threads to connect said floor slat to said drive beam, said bolt extending through said bolt opening with clearance between said bolt and sidewall portions of said bolt opening to allow lateral movement of said bolt relative to said base while the drive beam and floor slat are being connected to each other.

17. The reciprocating slat conveyor according to claim 16, wherein said connector comprises a laterally extending tongue and groove interface between said base and said nut element, said tongue and groove interface allowing lateral movement of said nut element relative to said base while the drive beam and floor slat are being connected to each other.

18. The reciprocating slat conveyor according to claim 17, wherein said connector comprises at least one bearing positioned between said base and said nut element, said bearing facilitating movement of said nut element relative to said base while the drive beam and floor slat are being connected to each other.

19. The reciprocating slat conveyor according to claim 16, wherein said connector comprises at least one bearing positioned between said base and said nut element, said bearing facilitating movement of said nut element relative to said base while the drive beam and floor slat are being connected to each other.

20. The reciprocating slat conveyor according to claim 19, wherein tightening said bolt to connect the floor slat to the drive beam compresses said bearing.

21. The reciprocating slat conveyor according to claim 16, wherein said nut element comprises a first member including said threads, and a separate second member positioned above said first member, said base being positioned between said first and second members, and said second member comprising said connecting member.

22. The reciprocating slat conveyor according to claim 20, wherein said nut element comprises a first member including said threads, and a separate second member positioned above said first member, said base being positioned between said first and second members, and said second member comprising said connecting member.

23. The reciprocating slat conveyor according to claim 22, wherein said connector comprises a fastener extending slidably through said first member and threadedly engaging said second member, and said bearing comprises an O-ring surrounding said fastener at an interface between said base and said nut element.

24. The reciprocating slat conveyor according to claim 16, wherein said base comprises an elongated tubular member having an upper wall, a lower wall, and two sidewalls, said sidewalls connecting said upper wall to said lower wall; and said nut element is positioned between said upper wall and said lower wall.

25. The reciprocating slat conveyor according to claim 24, wherein said connector comprises at least one positioning element connected to said base between said upper wall and said lower wall, said positioning element supporting said nut element and restricting longitudinal movement of said nut element relative to said base while the drive beam and floor slat are being connected to each other.

26. The reciprocating slat conveyor according to claim 25, wherein said positioning element comprises a pair of brackets positioned adjacent to longitudinally opposite ends of said tubular member, each said bracket having an upper leg secured to said tubular member, a lower leg that supports said nut element, and an intermediate leg interconnecting said upper and lower legs.

27. The reciprocating slat conveyor according to claim 24, wherein said base is secured to said drive beam by a plurality of bolts extending through said lower wall and having heads positioned between said upper wall and said lower wall.

28. The reciprocating slat conveyor according to claim 27, wherein said sidewalls are deformed to contact and engage said heads to prevent rotational movement of said plurality of bolts.

29. A method of attaching floor slats to a drive assembly of a reciprocating slat conveyor, said drive assembly including a plurality of transverse drive beams, said method comprising:

providing a connector for each slat; said connector having a base secured to one of the drive beams, and a nut element; and said base including a plurality of laterally elongated, longitudinally spaced openings extending therethrough;

preforming a plurality of longitudinally spaced openings in each slat;

positioning the slat above the drive beams, including aligning said openings in the slat with said openings in said base;

creating a connection between the slat and a selected drive beam by extending a bolt down through one of said openings in the slat, one of said openings in said base, and a threaded hole in said nut element, including allowing the slat to move laterally relative to said base to align the slat laterally with the drive beam, and also including turning said bolt to threadedly engage said nut element and tighten the connection between the slat and the drive beam.

* * * * *